United States Patent Office 2,753,350
Patented July 3, 1956

2,753,350
PUNGENT-TASTING PENTAVALENT PIPERAZINE DIACID SALTS

Torsten Hasselstrom, Philadelphia, Pa.

No Drawing. Application November 1, 1951,
Serial No. 254,430

2 Claims. (Cl. 260—268)

(Granted under Title 35, U. S. Code (1952), sec. 266)

The invention described herein, if patented, may be manufactured and used by or for the Government for governmental purposes, without the payment to me of any royalty thereon.

This invention is concerned with piperazine diacid salts, wherein the two nitrogen atoms of a piperazine ring are pentavalent and are substituted by the residue of an aromatic-aliphatic acid characterized by a chain of five carbon atoms. The piperazine diacid salts are characterized by a pleasantly pungent pepper taste, and are suitable as synthetic condiments of the pepper type.

The piperazine diacid salts of the present invention have the general formula

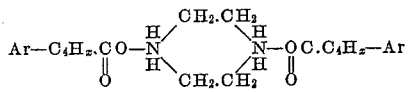

wherein Ar is an aryl residue and $x$ is an even integral number from 4 to 8; the pentavalent nitrogen linkages thus have the configuration

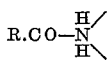

as distinguished from trivalent nitrogen linkages in diacyl piperazines having the configuration

N-pentavalent piperazine diacid salts having the foregoing generic formula are:

Piperazine-1,4-di-(5-phenyl valerate) salt; $C_{26}H_{38}O_4N_2$
Piperazine-1,4-di-(5-phenyl pentenoate) salt;
$C_{26}H_{34}O_4O_2$
Piperazine-1,4-di-(cinnamenyl-acrylate); $C_{26}H_{30}O_4N_2$ I have found that, surprisingly, the N-pentavalent piperazine diacid salts in accordance with the present invention (pentavalent nitrogen linkages) possess a peppery taste which renders them useful as pepper substitutes and as synthetic biting materials in similar condiment and other food compositions, while the corresponding diacyl piperazines (trivalent nitrogen linkage) are water-insoluble and tasteless.

The N-pentavalent piperazine diacid salts of the type herein described are water-soluble crystalline compounds; they are unstable to heat, in that upon being severely heated they split off two molecules of $H_2O$ and thereby are converted to the corresponding diacyl piperazines (trivalent nitrogen linkage).

The N-pentavalent piperazine diacid salts in accordance with the present invention are synthesized by reacting an aromatic-aliphatic acid of the general formula

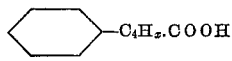

wherein $x$ is an even integral number from 4 to 8 with anhydrous piperazine or (preferably) piperazine hexahydrate; care must be taken not to use excessive heat in order to avoid the formation of diacyl piperazines (trivalent nitrogen). It is not permissible to substitute acyl chloride for the acid, because this substitution would result in the formation of diacyl piperazines (trivalent nitrogen) rather than the desired N-pentavalent piperazine diacid salts (pentavalent nitrogen). I have found gentle refluxing of the reactants with benzene (boiling point about 80° C.) or xylene (boiling point about 140° C.) to be useful.

Among acids suitable as starting materials for the formation of N-pentavalent piperazine diacid salts in accordance with the present invention are:

5-phenyl-n-valeric acid
5-phenyl-2-pentenoic acid
5-phenyl-3-pentenoic acid
β-Cinnamenyl acrylic acid.

The following examples illustrate typical reactions leading to the formation of pungent-tasting N-pentavalent piperazine diacid salts in accordance with the present invention.

Example 1

Piperazine-1,4-di-(5-phenyl valerate). — 25 g. of 5-phenyl-n-valeric acid were dissolved in approximately 250 g. of xylene with 12.5 g. of anhydrous piperazine. The mixture was then refluxed for four hours while water was taken off with a Dean-Stark still head. During the reaction a white feathery precipitate was formed, which was filtered off and recrystallized from benzene until the melting point became constant, 119.5° C. (uncorr.). Yield: 17 g. (38.5% of theory). The compound is water-soluble and has the pungent taste of black pepper.

Analysis. — Calculated for $C_{26}H_{38}O_4N_2$: N, 6.31. Found: 6.44.

Structural formula:

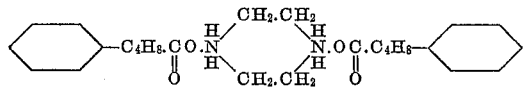

Example 2

Piperazine-1-4-di-(5-phenyl-2-pentenoate). — A stoichiometric amount of 20.0 g. 5-phenyl-2-pentenoic acid and 11.0 g. of piperazine hexahydrate were added to 250 cc. of ethanol. A white precipitate formed which was filtered off and washed with ethanol and ether, M. P. 152–153° C. (uncorr.). White, water-soluble crystals of a pungent, peppery taste were obtained.

Analysis. — Calculated for $C_{26}H_{34}O_4O_2$: N, 6.39. Found: 6.31, 6.27.

Structural formula:

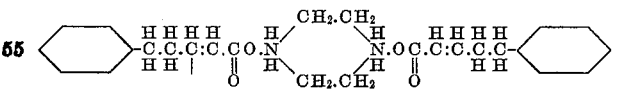

Example 3

Piperazine-1,4-di-(5-phenyl-3-pentenoate). — 20 g. of 5-phenyl-3-pentenoic acid were dissolved in about 200 cc. of benzene to which were added 11.5 g. piperazine hexahydrate. After gentle reflux for about 24 hours with efficient stirring the reaction mixture, containing a precipitated white solid, was allowed to cool to room temperature. The precipitate (23.7 g.) was filtered off and recrystallized to constant melting point from dilute ethanol, 126.5–127° C. (uncorr.). The piperazine-1,4-di-(5-phenyl-3-pentenoate) salt is a white, water-soluble crystalline substance of a strong peppery taste.

Analysis. — Calculated for $C_{26}H_{34}O_4N_2$: N, 6.39. Found: 6.56, 6.64.

Structural formula:

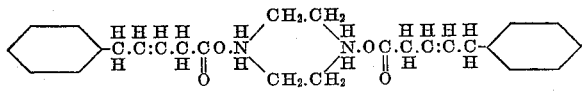

The corresponding di(5 - phenyl - 3 - pentenoyl) - piperazine (trivalent nitrogen linkage; empirical formula $C_{26}H_{30}O_2N_2$) was prepared by heating together, for several hours, 31 g. of 5-phenyl-3-pentenoyl acyl chloride and 33 g. of piperazine hexahydrate. The resulting product was a water-insoluble tasteless brownish oil.

*Example 4*

*Piperazine-1,4-di-(β-cinnamenyl-acrylate).*—20 g. of β-cinnamenyl acrylic acid and 11.6 g. piperazine hexahydrate were dissolved in about 250 cc. of benzene. After gentle reflux for approximately 20 hours, during which time a white solid precipitated, the mixture was allowed to cool and the piperazonium salt filtered off. Yield—7 g. of piperazine-1,4-di-(β-cinnamenyl-acrylate) salt, melting at 196–197° C. (uncorr.) from dilute ethanol. The compound consists of white, water-soluble crystals, which have a pronounced peppery taste. It lowered the melting point to 174–176° C. in the mixed melting point test with an authentic sample of di-(β-cinnamenyl acryloyl)-piperazine, M. P. 209–209.5° C. (uncorr.).

*Analysis.*—Calculated for $C_{26}H_{30}O_4N_2$: N, 6.45. Found: 6.32, 6.35.

Structural formula:

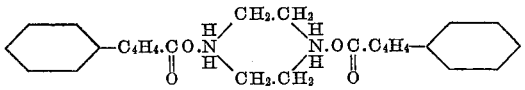

The N-pentavalent piperazine diacid salts in accordance with the present invention may be ground together with a conventional carrier such as flour to obtain a powdered pepper substitute, or they may be added to a liquid condiment such as a pepper sauce in the form of their water solutions.

My invention is not limited to the specific syntheses set forth in the foregoing examples; I rather desire to define its scope by the appended claims.

I claim:
1. Piperazine-1,4-di-(cinnamenyl-acrylate), being an N-pentavalent piperazine diacid salt.
2. The process of imparting a pungent peppery taste to a comestible, comprising adding thereto N-pentavalent piperazine-1,4-di-(cinnamenylacrylate).

References Cited in the file of this patent

Prigot et al.: JACS, vol. 70, pp. 2758–9 (1948).
Hasselstrom et al.: Science 112, 626–27 (1950).
Pollard et al.: JACS 56, 150 (1934).
Staudinger et al.: Ber. Deut. Chem. 56, 699–711 (1923).
Riccomanni: Atti. Accad. Lincei (V) 33; 145–8 (1924).
Sandermann: Seifensieder Ztg., 68, 41 (1941).
Richter: Textbook of Org. Chem., pp. 124–25 (1938 ed.).